United States Patent [19]

Coleman

[11] 4,194,985

[45] Mar. 25, 1980

[54] POLYMERIC COMPOSITIONS, METHOD FOR THEIR PREPARATION, AND LUBRICANTS CONTAINING THEM

[75] Inventor: Lester E. Coleman, Willoughby Hills, Ohio

[73] Assignee: The Lubrizol Corporation, Wickliffe, Ohio

[21] Appl. No.: 433,322

[22] Filed: Jan. 14, 1974

[51] Int. Cl.$^2$ ............................................. C10M 1/32
[52] U.S. Cl. .................. 252/51.5 A; 252/50; 252/51.5 R; 252/56 R
[58] Field of Search ............... 252/50, 51.5 A, 51.5 R, 252/56 R, 59

[56] References Cited

U.S. PATENT DOCUMENTS

| | | | |
|---|---|---|---|
| 2,543,964 | 3/1951 | Giammaria | 252/56 R |
| 2,600,384 | 6/1952 | Bauer et al. | 252/56 R X |
| 3,074,916 | 1/1963 | Fields | 252/51.5 A X |
| 3,251,906 | 5/1966 | Bauer | 252/51.5 A X |
| 3,272,746 | 9/1966 | Le Suer et al. | 252/51.5 A X |
| 3,301,784 | 1/1967 | Anderson | 252/51.5 R |
| 3,329,658 | 7/1967 | Fields | 252/51.5 R X |
| 3,340,281 | 9/1967 | Brannen | 252/34 X |
| 3,342,786 | 9/1967 | Emmons | 252/51.5 R X |
| 3,342,788 | 9/1967 | Brod | 252/51.5 A X |
| 3,400,075 | 9/1968 | Grimm et al. | 252/51.5 A X |
| 3,458,597 | 7/1969 | Jabloner | 252/56 R X |
| 3,473,901 | 10/1969 | de Benneville et al. | 252/51.5 R X |
| 3,479,327 | 11/1969 | Merijan et al. | 252/51.5 R X |
| 3,501,405 | 3/1970 | Willette | 252/51.5 A |
| 3,630,902 | 12/1971 | Coupland et al. | 252/51.5 A |
| 3,687,849 | 8/1972 | Abbott | 252/51.5 A X |
| 3,694,176 | 9/1972 | Miller | 252/56 R X |
| 3,732,334 | 5/1973 | Koch et al. | 252/51.5 R X |
| 3,746,645 | 7/1973 | Saito et al. | 252/51.5 A |

*Primary Examiner*—Andrew Metz
*Attorney, Agent, or Firm*—James W. Adams, Jr.; William H. Pittman

[57] ABSTRACT

Compositions useful as multi-purpose lubricant and functional fluid additives and as thickeners and antisag additives for resins, paints and the like are prepared by free radical polymerization of at least one ethylenically unsaturated monomer in the presence of an oil-soluble dipersant. The carboxylic dispersants are preferred, especially esters of hydrocarbon-substituted succinic acids wherein the substituent contains at least about 30 carbon atoms and the reaction products of such acids or their derivatives with amines, usually polyalkylene polyamines.

8 Claims, No Drawings

POLYMERIC COMPOSITIONS, METHOD FOR THEIR PREPARATION, AND LUBRICANTS CONTAINING THEM

This invention relates to new compositions of matter useful as additives for lubricants, fuels, resins and the like, and to methods for their preparation. More particularly, it relates to compositions prepared by polymerizing, under free radical polymerization conditions, (A) at least one ethylenically unsaturated monomer in the presence of (B) at least one oil-soluble dispersant characterized by the presence of an oil-solubilizing group containing at least about 30 aliphatic carbon atoms and a polar group bonded thereto.

The preparation of multi-purpose lubricant and functional fluid additives is of continuing importance. In particular, it is often desired to modify the properties of dispersants and the like, as by providing them with viscosity modifying or extreme pressure properties as well as dispersant properties. It is also of interest to develop thickeners, anti-sag agents and the like for paints and resins.

A principal object of this invention, therefore, is to prepare new polymeric compositions of matter.

A further object is to prepare multi-purpose compositions for use in lubricants, functional fluids and fuels.

A further object is to prepare compositions which impart favorable properties to resin and plastic systems.

Other objects will in part be obvious and will in part appear hereinafter.

Reagent A used in the method of this invention is at least one ethylenically unsaturated monomer. Many of such monomers are, of course, known and any of these may be used. They include (1) unsaturated monohydric alcohols and esters thereof, (2) unsaturated carboxylic acids and esters thereof, (3) unsaturated polyhydric alcohols and esters thereof, (4) vinyl cyclic compounds, (5) unsaturated ethers, (6) unsaturated ketones, (7) unsaturated amides, (8) unsaturated aliphatic hydrocarbons, (9) alkenyl halides, (10) unsaturated acid anhydrides, (11) unsaturated acid halides, and (12) unsaturated nitriles. Specific illustrations of such compounds are:

1. Unsaturated alcohols and esters thereof: Allyl, methallyl, crotyl, 1-chloroallyl, 2-chloroallyl, cinnamyl, vinyl, methylvinyl, 1-phenallyl, butenyl alcohols, and esters of such alcohols with saturated acids such as acetic, propionic, butyric, valeric, caproic and stearic; with unsaturated acids such as acrylic, alpha-substituted acrylic (including alkylacrylic, e.g., methacrylic, ethylacrylic, propylacrylic, etc., and arylacrylic such as phenylacrylic), crotonic, oleic, linoleic and linolenic; with polybasic acids such as oxalic, malonic, succinic, glutaric, adipic, pimelic, suberic, azelaic and sebacic; with unsaturated polybasic acids such as maleic, fumaric, citraconic, mesaconic, itaconic, methylenemalonic, acetylenedicarboxylic and aconitic; and with aromatic acids, e.g., benzoic, phenylacetic, phthalic, terephthalic and benzoylphthalic acids.

2. Unsaturated acids (examples of which appear above) and esters thereof with saturated alcohols, such as methyl, ethyl, propyl, isopropyl, butyl, isobutyl, sec-butyl, tert-butyl, 2-ethylhexyl, cyclohexyl or behenyl alcohols.

3. Unsaturated polyhydric alcohols, e.g., butenediol, and esters thereof with saturated and unsaturated aliphatic and aromatic, monobasic and polybasic acids, examples of which appear above.

4. Vinyl cyclic compounds including styrene, o-, m-, p-chlorostyrenes, bromostyrenes, fluorostyrenes, methylstyrenes, ethylstyrenes and cyanostyrenes; di-, tri-, and tetra-chlorostyrenes, bromostyrenes, fluorostyrenes, methylstyrenes, ethylstyrenes, cyanostyrenes; vinylnaphthalene, vinylcyclohexane, divinylbenzene, trivinylbenzene, allylbenzene, and heterocycles such as vinylfuran, vinylpyridine, vinylbenzofuran, N-vinylcarbazole, N-vinylpyrrolidone, N-vinylthiopyrrolidone and N-vinyloxazolidone.

5. Unsaturated ethers such as methyl vinyl ether, ethyl vinyl ether, cyclohexyl vinyl ether, octyl vinyl ether, diallyl ether, ethyl methallyl ether and allyl ethyl ether.

6. Unsaturated ketones, e.g., methyl vinyl ketone and ethyl vinyl ketone.

7. Unsaturated amides, such as acrylamide, methacrylamide, N-methylacrylamide, N-phenylacrylamide, N-allylacrylamide, N-methylolacrylamide, N-allylcaprolactam, diacetone acrylamide, hydroxymethylated diacetone acrylamide, N-(1,1-dimethyl-3-hydroxybutyl)acrylamide and 2-acrylamido-2-methylpropanesulfonic acid.

8. Unsaturated aliphatic hydrocarbons, for instance, ethylene, propylene, butenes, butadiene, isoprene, 2-chlorobutadiene and alpha-olefins in general.

9. Alkenyl halides, e.g., vinyl fluoride, vinyl chloride, vinyl bromide, vinylidene chloride, vinylidene bromide, allyl chloride and allyl bromide.

10. Unsaturated acid anhydrides, e.g., maleic, citraconic, itaconic, cis-4-cyclohexene-1,2-dicarboxylic and bicyclo(2,2,1)-5-heptene-2,3-dicarboxylic anhydrides.

11. Unsaturated acid halides such as cinnamoyl, acrylyl, methacrylyl, crotonyl, oleyl and fumaryl chlorides or bromides.

12. Unsaturated nitriles, e.g., acrylonitrile, methacrylonitrile and other substituted acrylonitriles.

The preferred monomers for use as reagent A are those from the above list containing from 3 to about 10 carbon atoms and having a terminal olefinic bond, especially vinyl-type aromatic compounds (chiefly substituted benzenes such as styrene, vinyltoluene and α-methylstyrene), vinyl-substituted nitrogen-containing heterocyclic compounds (chiefly lactams and their thio analogs such as N-vinylpyrrolidone and N-vinylthiopyrrolidone), vinyl carboxylates (e.g., vinyl acetate, vinyl propionate), and acrylic monomers. By "acrylic monomers" is meant acrylic and methacrylic acids and their esters, amides and nitriles. Especially preferred are styrene, acrylonitrile and diacetone acrylamide.

Reagent B, as previously indicated, is at least one oil-soluble dispersant. The characterizing feature of the dispersant, with respect to molecular structure, is the presence of an oil-solubilizing group containing at least about 30 aliphatic carbon atoms bonded directly to a polar group. The dispersant may contain more than one of either of such groups per molecule, as will be apparent from the description hereinafter.

Many of the materials contemplated as reagent B are referred to as "ashless dispersants" although, depending on its constitution, the dispersant may upon combustion yield a non-volatile material such as boric oxide or phosphorus pentoxide. It does not, however, ordinarily contain metal and therefore does not yield a metal-containing ash on combustion.

Dispersants of this type are known in the art and are described in various patents. Any of such dispersants are suitable for use in preparing the compositions of this invention. The following are illustrative: p (1) Reaction products of carboxylic acids (or derivatives thereof) containing at least about 34 and preferably at least about 54 aliphatic carbon atoms with nitrogen-containing compounds such as amines, ureas and hydrazines, with organic hydroxy compounds such as phenols and alcohols, and/or with basic inorganic materials. Examples of these products, referred to herein as "carboxylic dispersants", are described in British Patent 1,306,529 and in many U.S. Pat. Nos. including the following:

| | | |
|---|---|---|
| 3,163,603 | 3,351,552 | 3,541,012 |
| 3,184,474 | 3,381,022 | 3,542,678 |
| 3,215,707 | 3,399,141 | 3,542,680 |
| 3,219,666 | 3,415,750 | 3,567,637 |
| 3,271,310 | 3,433,744 | 3,574,101 |
| 3,272,746 | 3,444,170 | 3,576,743 |
| 3,281,357 | 3,448,048 | 3,630,904 |
| 3,306,908 | 3,448,049 | 3,632,510 |
| 3,311,558 | 3,451,933 | 3,632,511 |
| 3,316,177 | 3,454,607 | 3,697,428 |
| 3,340,281 | 3,467,668 | 3,725,441 |
| 3,341,542 | 3,501,405 | Re 26,433 |
| 3,346,493 | 3,522,179 | |

(2) Reaction products of aliphatic or alicyclic halides containing at least about 30 carbon atoms with amines, preferably polyalkylene polyamines. These may be characterized as "amine dispersants" and examples thereof are described, for example, in the following U.S. Pat. Nos.:

| | |
|---|---|
| 3,275,554 | 3,454,555 |
| 3,438,757 | 3,565,804 |

(3) Reaction products of alkyl phenols in which the alkyl group contains at least about 30 carbon atoms with aliphatic $C_{\geq 7}$ aldehydes (especially formaldehyde) and amines (especially polyalkylene polyamines), which may be characterized as "Mannich dispersants". The materials described in the following U.S. Pat. Nos. are illustrative:

| | |
|---|---|
| 3,413,347 | 3,725,480 |
| 3,697,574 | 3,726,882 |
| 3,725,277 | |

(4) Products obtained by post-treating the carboxylic, amine or Mannich dispersants with such reagents as urea, thiourea, carbon disulfide, aldehydes, ketones, carboxylic acids, hydrocarbon-substituted succinic anhydrides, nitriles epoxides, boron compounds, phosphorus compounds or the like. Exemplary materials of this kind are described in the following U.S. Pat. Nos.:

| | | |
|---|---|---|
| 3,036,003 | 3,367,943 | 3,579,450 |
| 3,087,936 | 3,373,111 | 3,591,598 |
| 3,200,107 | 3,403,102 | 3,600,372 |
| 3,216,936 | 3,442,808 | 3,639,242 |
| 3,254,025 | 3,455,831 | 3,649,229 |
| 3,256,185 | 3,455,832 | 3,649,659 |
| 3,278,550 | 3,493,520 | 3,658,836 |
| 3,280,234 | 3,502,677 | 3,697,574 |
| 3,281,428 | 3,513,093 | 3,702,757 |
| 3,282,955 | 3,533,945 | 3,703,536 |
| 3,312,619 | 3,539,633 | 3,704,308 |
| 3,366,569 | 3,573,010 | 3,708,522 |

The pertinent disclosures of all of the above-noted patents are incorporated by reference herein.

Expecially useful as reagent B are dispersants having an average molecular weight no higher than about 5000. Of these, the carboxylic dispersants are preferred. They may be most conveniently and accurately described in terms of radicals I and II present therein. Radical I is usually an acyl, acyloxy or acylimidoyl radical containing at least about 34 carbon atoms. The structures of these radicals, as defined by the International Union of Pure and Applied Chemistry, are as follows (R representing a hydrocarbon or similar group):

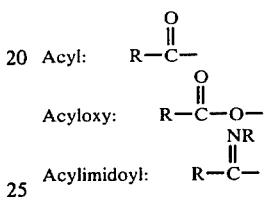

Radical II is preferably at least one radical in which a nitrogen or oxygen atom is attached directly to said acyl, acyloxy or acylimidoyl radical, said nitrogen or oxygen atom also being attached to a hydrocarbon radical or substituted hydrocarbon radical. Withk respect to radical II, the dispersants are conveniently classified as "nitrogen-bridged dispersants" and "oxygen-bridged dispersants" wherein the atom attached directly to radical I is nitrogen or oxygen, respectively.

The nitrogen-bridged dispersants, which will be described first, are those disclosed (for example) in the above-mentioned U.S. Pat. Nos. 3,219,666 and 3,272,746 which also describe a large number of methods for their preparation. The nitrogen-containing group therein is derived from compounds characterized by a radical of the structure >NH wherein the two remaining valences of nitrogen are satisfied by hydrogen, amino or organic radicals bonded to said nitrogen atom through direct carbon-to-nitrogen linkages. These compounds include aliphatic, aromatic, heterocyclic and carbocyclic amines as well as substituted ureas, thioureas, hydrazines, guanidines, amidines, amides, thioamides, cyanamides and the like.

Especially preferred as nitrogen-containing compounds used in the preparation of the nitrogen-bridged dispersants are alkylene polyamines and hydroxyalkyl-substituted alkylene polyamines. The alkylene polyamines comprise, in general, alkylene amines containing about 10 or less alkylene groups joined through nitrogen atoms. They include principally the ethylene amines, propylene amines, butylene amines and homologs thereof, and also piperazines and aminoalkyl-substituted piperazines. Hydroxyalkyl-substituted derivatives of these alkylene polyamines are also contemplated for use in preparing the nitrogen-bridged dispersant. Typical examples of suitable amines are ethylene diamine, triethylene tetramine, pentaethylene hexamine, propylene diamine, tripropylene tetramine, di-(trimethylene) triamine, 1,4-bis-(2-aminoethyl)piperazine, 1-(2-aminopropyl)piperazine, N-(2-hydroxyethyl)ethylene diamine, 1-(2-hydroxyethyl)piperazine, and 2-heptadecyl-1-(2-hydroxyethyl)-imidazoline. Also useful are the polyoxyalkylene polymines (e.g., "Jeffamines"). Mixtures of these amines may also be used.

The preferred amines are the polyethylene polyamines containing from two to about eight amino groups per molecule. A commercially available mixture of polyethylene polyamines containing an average of about 3-7 amino groups per molecule is particularly suitable.

The source of radical I in the nitrogen-bridged dispersant is an acylating agent comprising a carboxylic acid-producing compound containing a hydrocarbon or substituted hydrocarbon substituent which has at least about 30 and preferably at least about 50 carbon atoms. By "carboxylic acid-producing compound" is meant an acid, anhydride, acid halide, ester, amide, imide, amidine or the like; the acids and anhydrides are preferred.

The carboxylic acid-producing compound is usually prepared by the reaction (more fully described hereinafter) of a relatively low molecular weight carboxylic acid or derivative thereof with a hydrocarbon source containing at least about 30 and preferably at least about 50 carbon atoms. The hydrocarbon source is usually aliphatic and should be substantially saturated, i.e., at least about 95% of the total number of carbon-to-carbon covalent linkages should be saturated. It should also be substantially free from pendant groups containing more than about six aliphatic carbon atoms. It may be a substituted hydrocarbon source; by "substituted" is meant sources containing substituents which do not alter significantly their character or reactivity. Examples are halide, hydroxy, ether, keto, carboxy, ester (especially lower carbalkoxy), amide, nitro, cyano, sulfoxy and sulfone radicals. The substituents, if present, generally comprise no more than about 10% by weight of the hydrocarbon source.

The preferred hydrocarbon sources are those derived from substantially saturated petroleum fractions and olefin polymers, particularly polymers of monoolefins having from 2 to about 30 carbon atoms. Thus, the hydrocarbon source may be derived from a polymer of ethylene, propene, 1-butene, isobutene, 1-octene, 3-cyclohexyl-1-butene, 2-butene, 3-pentene or the like. Also useful are interpolymers of olefins such as those illustrated above with other polymerizable olefinic substances such as styrene, chloroprene, isoprene, p-methylstyrene, piperylene and the like. In general, these interpolymers should contain at least about 80%, preferably at least about 95%, on a weight basis of units derived from the aliphatic monoolefins.

Another suitable hydrocarbon source comprises saturated aliphatic hydrocarbons such as highly refined high molecular weight white oils or synthetic alkanes.

In main instances, the hydrocarbon source should contain an activating polar radical to facilitate its reaction with the low molecular weight acid-producing compound. The preferred activating radicals are halogen atoms, especially chlorine, but other suitable radicals include sulfide, disulfide, nitro, mercaptan, ketone and aldehyde groups.

As already pointed out, the hydrocarbon sources generally contain at least about 30 and preferably at least about 50 carbon atoms. Among the olefin polymers those having a molecular weight of about 700-5000 are preferred, although higher polymers having molecular weights from about 10,000 to about 100,000 or higher may sometimes be used. Especially suitable as hydrocarbon sources are isobutene polymers within the prescribed molecular weight range, and chlorinated derivatives thereof.

Any one of a number of known reactions may be employed for the preparation of the carboxylic acid-producing compound. Thus, an alcohol of the desired molecular weight may be ozidized with potassium permanganate, nitric acid or a similar oxidizing agent; a halogenated olefin polymer may be reacted with a ketene; an ester of an active hydrogen-containing acid, such as acetoacetic acid, may be converted to its sodium derivative and the sodium derivative reacted with a halogenated high molecular weight hydrocarbon such as brominated wax or brominated polyisobutene; a high molecular weight olefin may be ozonized; a methyl ketone of the desired molecular weight may be oxidized by means of the haloform reaction; an organometallic derivative of a halogenated hydrocarbon may be reacted with carbon dioxide; a halogenated hydrocarbon or olefin polymer may be converted to a nitrile, which is subsequently hydrolyzed; or an olefin polymer or its halogenated derivative may undergo a reaction with an unsaturated carboxylic acid or derivative thereof such as acrylic acid, methacrylic acid, maleic acid, maleic anhydride, fumaric acid, itaconic acid, itaconic anhydride, citraconic acid, citraconic anhydride, mesaconic acid, glutaconic acid, choromaleic acid, aconitic acid, crotonic acid, methylcrotonic acid, sorbic acid, 3-hexenoic acid, 10-decenoic acid, 2-pentene-1,3,5-tricarboxylic acid, and the like, or with a halogen-substituted carboxylic acid or derivative thereof. This latter reaction is preferred, especially when the acid-producing compound is unsaturated and preferably when it is maleic acid or anhydride. The resulting product is then a hydrocarbon-substituted succinic acid or derivative thereof. The reaction leading to its formation involves merely heating the two reactants at about 100°-200° C. The substituted succinic acid or anhydride thus obtained, may, if desired, be converted to the corresponding acid halide by reaction with known halogenating agents such as phosphorus trichloride, phosphorus pentachloride or thionyl chloride.

For the formation of the nitrogen-bridged dispersant, the hydrocarbon-substituted succinic anhydride or acid, or other carboxylic acid-producing compound, and the alkylene polyamine or other nitrogen-containing reagent are heated to a temperature above about 80° C., preferably about 100°-250° C. The product thus obtained has predominantly amide, imide and/or amidine linkages (containing acyl or acylamidoyl groups). The process may in some instances be carried out at a temperature below 80° C. to produce a product having predominantly salt linkages (containing acyloxy groups). The use of a diluent such as mineral oil, benzene, toluene, naphtha or the like is often desirable to facilitate control of the reaction temperature.

The relative proportions of the carboxylic acid-producing compound and the alkylene polyamine or the like are such that at least about one-half the stoichiometrically equivalent amount of polyamine is used for each equivalent of carboxylic acid-producing compound. In this regard it will be noted that the equivalent weight of the alkylene polyamine is based upon the number of amine radicals therein, and the equivalent weight of the carboxylic acid-producing compound is based on the number of acidic or potentially acidic radicals. (Thus, the equivalent weight of a hydrocarbon-substituted succinic acid or anhydride is one-half its molecular weight.) Although a minimum of one-half equivalent of polyamine per equivalent of acylating agent should be used, there does not appear to be an upper limit for the amount of polyamine. If an excess is used, it merely remains in the product unreacted without any apparent adverse effects. Ordinarily, about 1-2 equivalent of polyamine are used per equivalent of acylating agent.

In an alternative method for producing the nitrogen-bridged dispersant, the alkylene polyamine is first reacted with a low molecular weight, unsaturated or halogen-substituted carboxylic acid or derivative thereof (such as maleic anhydride or one of the others previously mentioned) and the resulting intermediate is subsequently reacted with the hydrocarbon source as previously described.

Oxygen-bridged dispersants comprise the esters of the above-described carboxylic acids, as described (for example) in the aforementioned U.S. Pat. Nos. 3,381,022 and 3,542,678. As such, they contain acyl or, occasionally, acylimidoyl radicals as radical I. (An oxygen-bridged dispersant containing an acyloxy radical as radical I would be a peroxide, which is unlikely to be stable under all conditions of use of the compositions of this invention.) These esters are preferably prepared by conventional methods, usually the reaction (frequently in the presence of an acidic catalyst) of the carboxylic acid-producing compound with an aliphatic compound such as a monohydric or polyhydric alcohol or with an aromatic compound such as a phenol or naphthol. The hydroxy compounds are usually alcohols containing up to about 40 aliphatic carbon atoms. These may be monohydric alcohols such as methanol, ethanol, isooctanol, dodecanol, cyclohexanol, neopentyl alcohol, monomethyl ether of ethylene glycol and the like, or polyhydric alcohols including ethylene glycol, diethylene glycol, dipropylene glycol, tetramethylene glycol, pentaerythritol, glycerol and the like. Carbohydrates (e.g., sugars, starches, cellulose) are also suitable as are partially esterified derivatives of polyhydric alcohols having at least three hydroxy radicals. Aliphatic polyols containing up to 10 carbon atoms and at least 3 hydroxy groups, especially those with up to 6 carbon atoms and 3-6 hydroxy groups, are preferred.

The esterification reaction is usually effected at a temperature above about 100° C. and typically at 150°-300° C. The esters may be neutral or acidic, or may contain unesterified hydroxy groups, according as the ratio of equivalents of acid-producing compound to hydroxy compound is equal to, greater than or less than 1:1.

It is possible to prepare mixed oxygen- and nitrogen-bridged dispersants by reacting the acylating agent simultaneously or, preferably, sequentially with nitrogen-containing and hydroxy reagents such as those previously described. The relative amounts of the nitrogen-containing and hydroxy reagents may be between about 10:1 and 1:10, on an equivalent weight basis. The methods of preparation of the mixed oxygen- and nitrogen-bridged dispersants are generally the same as for the individual dispersants described, except that two sources of radical II are used. Mixtures of independently prepared dispersants are also suitable. Mixed dispersants of these types are frequently preferred for the purposes of this invention.

Typical carboxylic dispersants suitable for use as reagent B are listed in the following table. "Reagent I" and "Reagent II" are, respectively, the sources of radicals I and II as previously defined.

TABLE I

| Example | Reagent I | Reagent II | Ratio of equivalents, I:II | Reaction temperature, ° C. | Diluent |
|---|---|---|---|---|---|
| 1 | Polyisobutenyl (mol. wt. about 900) succinic anhydride prepared from chlorinated polyisobutene | Polyethylene amine mixture containing about 3-7 amino groups per molecule | 0.48 | 150 | Mineral oil |
| 2 | Same as Example 1 | Pentaethylene hexamine | 0.41 | 150 | Mineral oil |
| 3 | Like Example 1 except polyisobutene mol. wt. is about 1050 | Pentaethylene hexamine | 0.61 | 150 | Mineral oil |
| 4 | Like Example 1, except polyisobutene mol. wt. is about 850 | Diethylene triamine | 1.0 | 150 | Mineral oil |
| 5 | Same as Example 4 | Ethylene diamine | 1.0 | 150 | Mineral oil |
| 6 | Same as Example 4 | Di-(1,2-propylene)triamine | 1.0 | 180-190 | Mineral oil-toluene |
| 7 | Same as Example 4 | N-(2-hydroxyethyl)-trimethylene diamine | 1.06 | 150-155 | Mineral oil |
| 8 | Same as Example 1 | Pentaerythritol, followed by polyethylene amine of Example 1 (ratio of equivalents 3.4:1) | 0.79 | 205-215 | Xylene |
| 9 | Same as Example 1 | Same as Example 1 | 0.67 | 150 | Mineral oil |
| 10 | Same as Example 1 | Same as Example 1 | 1.33 | 150 | Mineral oil |
| 11 | Like Example 1, except polyisobutene mol. wt. is about 1100 | Pentaerythritol, followed by polyethylene amine of Example 1 (ratio of equivalents 7.7:1) | 0.44 | 150-210 | Mineral oil |
| 12 | Acid produced by reaction of chlorinated (3.6% Cl) polyisobutene (mol. wt. 750) with KCN, followed by hydrolysis | Ethylene diamine | 2.0 | 150 | Xylene |
| 13 | Methyl ester produced by reaction of chlorinated (4.7% Cl) polyisobutene (mol. wt. 1000) with methyl methacrylate | Triethylamine tetramine | 1.0 | 140-200 | — |
| 14 | Reaction product of sodiomalonic ester with $C_{75}$ | Same as Example 1 | 0.4 | 150 | Xylene |

TABLE I-continued

| Example | Reagent I | Reagent II | Ratio of equivalents, I:II | Reaction temperature, ° C. | Diluent |
|---|---|---|---|---|---|
| 15 | brominated wax Reaction product of chlorinated (4.5% Cl) polyisobutene (mol. wt. 850) with acrylic acid | Pentaethylene hexamine | 0.8 | 180–200 | — |
| 16 | Acid produced by haloform reaction with methyl Heptacontanyl ketone | Same as Example 1 | 0.8 | 180–210 | — |
| 17 | Same as Example 11 | Pentaerythritol | 0.5 | 150–210 | Mineral oil |
| 18 | Like Example 1, except polyisobutene mol. wt. is about 1000 | Neopentyl glycol | 1.0 | 240–250 | — |
| 19 | Same as Example 18 | Methanol* | Excess methanol | 50–65 | Toluene |
| 20 | Same as Example 18 | Polyethylene glycol (mol. wt. about 600) | 2.0 | 240–250 | — |
| 21 | Same as Example 18 | Oleyl alcohol** | 1.0 | 150–173 | Xylene |
| 22 | Like Example 15, except polyisobutene mol. wt. is about 982 | Sorbitol | 0.48 | 115–205 | Mineral oil |
| 23 | Same as Example 22 | Pentaerythritol | 1.0 | 180–205 | — |
| 24 | Reaction product of polyisobutene (mol. wt. 1500) with chloroacetyl chloride | Mannitol | 0.33 | 115–205 | Mineral oil |

*Hydrogen chloride catalyst
**p-Toluenesulfonic acid catalyst

The compositions of this invention are prepared by merely mixing the desired monomer or monomer mixture with the dispersant and allowing free radical polymerization to take place. A substantially inert diluent is generally used; suitable diluents include such non-polar materials as mineral oil, benzene, toluene, xylene, hexane, heptane and petroleum naphtha; analogous halogenated hydrocarbons such as chlorobenzene; ethers, and the like. The polymerization is ordinarily initiated by one or more free radical polymerization catalysts such as benzoyl perodixe, tertiary butyl hydroperoxide, acetyl peroxide, hydrogen peroxide, azobisisobutyronitrile, isopropyl peroxydicarbonate, persulfate-bisulfite, persulfate-sodium formaldehyde sulfoxylate, chlorate-sulfite and the like, but may also be initiated by irradiation.

The temperature of polymerization is not critical. Usually, the polymerization reaction is carried out between room temperature and about 125° C., preferably about 30°–90° C.

Likewise, the proportions of reagents A and B are not critical. Generally, enough of reagent B is used to produce a stable solution or dispersion of the polymer in the diluent. For this purpose, the weight ratio of reagent B to reagent A may be as high as about 6:1 or as low as about 0.1:1. Weight ratios between about 0.8:1 and 4:1 are preferred.

Following completion of the polymerization reaction, the product may be recovered by conventional means, typically by removal of solvent by evaporation. However, diluent removal is frequently unnecessary to remove the diluent and in certain instances, as when the dileunt is mineral oil or a similar non-volatile material, may be inadvisable.

The exact chemical nature of the compositions of this invention is not known with certainty. The polymer of reagent A constitutes a substantial portion of the product; said polymer may be a separate molecular entity from the dispersant (reagent B) which may merely serve to disperse or suspend the same, or there may be some percentage of grafting of the polymer chain on the dispersant, as through the aliphatic portion thereof. A complete definition of the compositions of this invention, however, is possible only in terms of the method of their preparation.

The preparation of the compositions of this invention is illustrated by the following examples. All parts and percentages are by weight unless otherwise indicated.

EXAMPLE 25

Styrene, 175 grams, is mixed with 325 grams of a 60% mineral oil solution of the dispersant of Example 10 in a nitrogen atmosphere. A solution of 0.12 gram of azobisisobutyronitrile in 5 ml. of benzene is added and the mixture is stirred at 70°–73° C. for about 45 minutes. Stirring is continued at this temperature for 4 hours, during which period four additional 0.12-gram portions of azobisisobutyronitrile (in benzene solution) are added. The product is the desired composition, obtained as a 66% solution in mineral oil.

EXAMPLE 26

To a mixture of 24.5 grams of styrene and 45.5 grams of a 56% solution in mineral oil of the dispersant of Example 17 is added 1 ml. of a 10% heptane solution of isopropyl peroxydicarbonate. The reaction mixture is flushed with nitrogen, sealed in a bottle and agitated at 40° C. for 20 hours. An additional 1 ml. of the isopropyl peroxydicarbonate solution is then added and agitation is continued for an additional 24 hours at 40° C. The product is the desired composition (64% solution in mineral oil).

EXAMPLE 27

A mixture of 140 grams of styrene, 138 grams of a 56% solution in mineral oil of the dispersant of Example 17, and 247 grams of white oil is purged with nitrogen and heated to 75° C. A solution of 0.14 gram of benzoyl peroxide in 3 ml. of benzene is added and the mixture is stirred at 77°–78° C. for 1½ hours. Stirring is continued at this temperature for 9 hours as four additional portions of benzoyl peroxide solution are added. The traces of volatile material which are present are then removed by vacuum stripping at 80° C., yielding the desired product as the residue.

EXAMPLE 28

A mixture of 120 grams of acrylonitrile and 223 grams of a 60% solution in mineral oil of the dispersant of Example 9 is heated to 70° C. with stirring, and a solution of 0.12 gram of azobisisobutyronitrile in 5 ml. of benzene is added. Stirring is continued for 6 hours, during which time an additional 4 portions of azobisisobutyronitrile solution are added. At the end of this time 200 grams of mineral oil is added and volatiles are removed by vacuum stripping, yielding the desired product as the residue.

EXAMPLE 29

A mixture is prepared containing 12.5 grams of the dispersant of Example 8 (solvent-free) and 212.5 grams of a blend of 88.5% (by weight) diisodecyl azelate and 11.5% isodecyl pelargonate. The mixture is heated to 70° C. and purged with nitrogen, and 25 grams of acrylonitrile is added followed by a solution of 0.05 gram of azobisisobutyronitrile in 5 ml. of benzene. The mixture is stirred for ½ hour, after which an additional portion of the azobisisobutyronitrile solution is added. Stirring is continued for 2½ hours, after which volatile materials are removed by vacuum stripping to yield the desired product as the residue.

EXAMPLE 30

A mixture of 19.5 grams of a 64.7% solution in xylene of the dispersant of Example 8, 50 grams of acrylonitrile and 187.5 grams of Stoddard solvent is purged with nitrogen and heated to 70° C. A solution of 0.05 gram of azobisisobutyronitrile in 5 ml. of benzene is added and the mixture is stirred for 4 hours at 70°–75° C., yielding the desired product.

EXAMPLE 31

A mixture of 262.5 grams of acrylonitrile and 487.5 grams of a 56% solution in mineral oil of the dispersant of Example 17 is purged with nitrogen and heated to 70° C. A solution of 0.25 gram of benzoyl peroxide in 5 ml. of benzene is added, and the mixture is stirred for ½ hour at 70°–78° C. Stirring is continued at this temperature for about 6½ hours, during which time four additional portions of benzoyl peroxide solution are added. Benzene, 25 ml., is added and volatile materials are removed by vacuum stripping to yield the desired product as the residue.

EXAMPLE 32

A mixture of 325 grams of a 60% mineral oil solution of the dispersant of Example 10 and 175 grams of diacetone acrylamide is purged with nitrogen and heated to 65° C. A solution of 0.12 gram of azobisisobutyronitrile in 5 ml. of benzene is added and the mixture is stirred for 45 minutes at 66°–77° C. Stirring at this temperature is continued for about 5 hours, during which time 4 additional 0.12-gram portions of azobisisobutyronitrile (in benzene solution) are added. Volatile materials are then removed by vacuum stripping, yielding the desired product as the residue.

EXAMPLE 33

An ester-dispersant mixture identical with that of Example 29 is prepared and heated to 70°–75° C. under nitrogen. Diacetone acrylamide, 25 grams, is added, followed by a solution of 0.05 gram of azobisisobutyronitrile in 5 ml. of benzene. The mixture is stirred at 70°–75° C. for 4 hours, after which volatile materials are removed by vacuum stripping, yielding the desired product as the residue.

EXAMPLE 34

A mixture of 31 grams of a 64.7% solution in xylene of the disperant of Example 8, 80 grams of diacetone acrylamide and 175 grams of Stoddard solvent is purged with nitrogen and heated to 70° C. A solution of 0.05 gram of azobisisobutyronitrile in 5 ml. of benzene is added and the mixture is stirred for 4 hours at 70°–80° C., yielding the desired product.

EXAMPLE 35

A mixture of 162 grams of diacetone acrylamide and 300 grams of a 56% solution in mineral oil of the dispersant of Example 17 is purged with nitrogen and heated to 65° C. A solution of 0.1 gram of benzoyl peroxide in 5 ml. of benzene is added, and the mixture is stirred for ½ hour at 78°–81° C. Stirring is continued at this temperature for about 5½ hours, during which time four additional portions of benzoyl peroxide solution are added. Volatile materials are then removed by vacuum stripping to yield the desired product as the residue.

EXAMPLE 36

A mixture of 250 grams of n-butyl acrylate and 750 grams of a 60% mineral oil solution of the dispersant of Example 1 is purged with nitrogen and heated to 70° C. A solution of 1 gram of azobisisobutyronitrile in 10 ml. of benzene is added and the mixture is stirred for 1½ hours at 70°–80° C. Stirring is continued for 8½ hours, during which time benzene solutions of two additional 0.5-gram portions, and finally of a 1.0-gram portion, of azobisisobutyronitrile are added. Volatile materials are then removed by vacuum stripping and the residue is diluted with 105 grams of mineral oil and filtered to yield the desired product.

EXAMPLE 37

A mixture of 50 grams of N-vinylpyrrolidone and 450 grams of a 56% solution in mineral oil of the dispersant of Example 17 is purged with nitrogen and heated to 70° C. A solution of 0.1 gram of azobisisobutyronitrile in 5 ml. of benzene is added and the mixture is stirred for 1 hour at 70°–75° C. Stirring at this temperature is continued for 4½ hours as 3 additional portions of azobisisobutyronitrile solution are added. The mixture is stirred for an additional 2 hours at 78°–80° C. and then volatile materials are removed by vacuum stripping, yielding the desired product as the residue.

EXAMPLE 38

Following the procedure of Example 36, a product is prepared from 30 grams of N-vinylthiopyrrolidone, 270 grams of a mineral oil solution of the dispersant of Example 17, and a solution of 0.2 gram of azobisisobutyronitrile in 20 ml. of benzene (added in 4 increments).

EXAMPLE 39

A mixture of 14 grams of vinyl acetate and 56 grams of a 56% solution in mineral oil of the dispersant of Example 17 is placed in a high-pressure bottle, and 1 ml. of a 10% heptane solution of isopropyl peroxydicarbonate is added. The bottle is flushed with nitrogen, capped and shaken at 40° C. for 20 hours. An additional 1 ml. of isopropyl peroxydicarbonate solution is added and agitation is continued for 24 hours at 40° C. The mixture is vacuum stripped to yield the desired product as the residue.

EXAMPLE 40

A mixture of 150 grams of diacetone acrylamide, 8 grams of acrylamide, 62 grams of a 64.7% solution in xylene of dispersant of Example 8, and 350 grams of Stoddard solvent is purged with nitrogen and heated to 70° C. A solution of 0.1 gram of azobisisobutyronitrile in 5 ml. of benzene is added and the mixture is stirred at 70°-80° C. for 4 hours to yield the desired product.

EXAMPLE 41

A mixture of 80 grams of diacetone acrylamide, 80 grams of acrylonitrile, 62 grams of a 64.7% solution in xylene of the dispersant of Example 8, and 350 grams of Stoddard solvent is purged with nitrogen and heated to 70° C. A solution of 0.1 gram of azobisisobutyronitrile in 5 ml. of benzene is added and the mixture is stirred at 70°-80° C. for 4 hours. A small amount of solid separates and the liquid is decanted therefrom; the liquid constitutes the desired product.

EXAMPLE 42

A mixture of 250 grams of a 56% solution in mineral oil of the dispersant of Example 17, 175 grams of N-vinyl-pyrrolidone, 45 grams of a mixture of $C_{12-14}$ dialkyl fumarates and 167 grams of mineral oil is purged with nitrogen and heated to 70° C. A solution of 2 grams of azobisisobutyronitrile in 40 ml. of benzene is prepared and added in 4 equal increments at 1-hour intervals. Following the addition of the final portion of azobisisobutyronitrile, the mixture is stirred for 2 hours at 78°-82° C. and is then vacuum stripped, yielding the desired product as the residue.

As previously mentioned, the compositions of this invention are useful as multi-purpose additives in lubricants, fuels and functional fluids, to improve dispersancy and at the same time extreme pressure properties or viscosity. They can be employed in a variety of lubricating compositions, and functional fluids based on diverse oils of lubricating viscosity, including natural and synthetic lubricating oils and mixtures thereof. The lubricating compositions contemplated include crankcase lubricating oils for spark-ignited and compression-ignited internal combustion engines including automobile and truck engines, two-cycle engine lubricants, aviation piston engines, marine and railroad diesel engines, and the like, as well as automatic transmission fluids, transaxle lubricants, gear lubricants, metal-working lubricants, hydraulic fluids, and other lubricating oil and grease compositions.

Natural oils include animal oils and vegetable oils (e.g., castor oil, lard oil) as well as solvent-refined or acid-refined mineral lubricating oils of the paraffinic, naphthenic, or mixed paraffinic-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); alkylbenzenes (e.g., dodecylbenzenes, tetradecylbenzene, dinonylbenzenes, di-(2-ethylhexyl) benzenes, etc.); polyphenyls (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500-1000, diethyl ether of polypropylene glycol having a molecular weight of 1000-1500, etc.) or mono- and polycarboxylic esters thereof, for example, the acetic acid esters, mixed $C_3$-$C_8$ fatty acid esters, or the $C_{13}$ Oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl) silicate, tetra-(4-methyl-2-tetraethyl) silicate, tetra-(p-tert-butylphenyl) silicate, hexyl-(4-methyl-2-pentoxy)-disiloxane, poly(methyl)-siloxanes, poly(methylphenyl)-siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans, and the like.

In general, about 0.05-20.0 parts (by weight) of the composition of this invention is dissolved or stably dispersed in 100 parts of oil to produce a satisfactory fluid. The invention also contemplates the use of other additives in combination with the products of this invention. Such additives include, for example, detergents and dispersants of the ash-producing or ashless type, oxidation inhibiting agents, pour point depressing agents, extreme pressure agents, color stabilizers and anti-foam agents.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline, phenylenediamine, phenothiazine, phenyl-β-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°–200° C.

Ashless detergents and dispersants are illustrated by the interpolymers of an oil-solubilizing monomer, e.g., decyl methacrylate, vinyl decyl ether, or high molecular weight olefin, with a monomer containing polar substituents, e.g., aminoalkyl acrylate or poly-(oxyethylene)-substituted acrylate; the amine salts, amides, and imides of oil-soluble monocarboxylic or dicarboxylic acids such as stearic acid, oleic acid, tall oil acid, and high molecular weight alkyl or alkenyl-substituted succinic acid. Especially useful are the compositions described hereinabove as useful as reagent B.

Extreme pressure agents and corrosion-inhibiting and oxidation-inhibiting agents are exemplified by chlorinated aliphatic hydrocarbons such as chlorinated wax; organic sulfides and polysulfides such as benzyl disulfide, bis(chlorobenzyl) disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl)phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

The compositions of this invention can be added directly to the lubricant or functional fluid or they can be diluted with an inert diluent such as mineral oil to form an additive concentrate. These concentrates generally contain about 20–90% by weight of the composition of this invention and may contain, in addition, one or more of the other additives described hereinabove.

Typical lubricating compositions of this invention are listed in the following table. Except of the values for mineral oil and for the products of Examples 25, 28, 32 and 41, all amounts are exclusive of mineral oil used as diluent.

| Ingredient | Lubricant | Parts by weight | | | |
| --- | --- | --- | --- | --- | --- |
| | | A | B | C | D |
| Mineral oil (SAE 10W-30 base) | | 89.3 | 90.49 | 89.34 | 90.49 |
| Product of Example 25 | | 6.62 | — | — | — |
| Product of Example 28 | | — | 6.62 | — | — |
| Product of Example 32 | | — | — | 6.62 | — |
| Product of Example 41 | | — | — | — | 6.62 |
| Dispersant of Example 17 | | 1.73 | 0.58 | 1.73 | 1.73 |
| Basic calcium petroleum sulfonate | | 0.97 | 0.97 | 0.97 | 0.97 |
| Zinc salt of mixture of isobutyl- and primary amylphosphorodithioic acids | | 0.84 | 0.84 | 0.84 | 0.84 |
| Sulfurized copolymer of butadiene and butyl acrylate | | 0.50 | 0.50 | 0.50 | 0.50 |
| Silicone anti-foam agent | | 0.004 | 0.004 | 0.004 | 0.004 |

The compositions of this invention are also useful as thickeners and anti-sag agents for alkyd and epoxy paints and for unsaturated polyester systems. For example, addition of 4 parts by weight of the product of Example 31 to 100 parts of a solution in styrene of an unsaturated polyester derived from phthalic acid causes about a two-fold increase in Brookfield viscosity.

What is claimed is:

1. An additive concentrate comprising an inert diluent and, dissolved or stably dispersed therein, about 20–90% by weight of a composition prepared by polymerizing, under free radical polymerization conditions and at a temperature of about 30°–90° C., (A) at least one ethylenically unsaturated monomer having from 3 to about 10 carbon atoms and a termianl olefinic bond and selected from the group consisting of unsaturated monohydric and polyhydric alcohols and carboxylic acid esters thereof, esters of unsaturated carboxylic acids and saturated alcohols, vinyl cyclic compounds, unsaturated ethers, unsaturated ketones, amides of unsaturated carboxylic acids, unsaturated aliphatic hydrocarbons, alkenyl halides and unsaturated nitriles; in the presence of (B) at least one oil-soluble dispersant incapable of addition polymerization, said dispersant being prepared by the reaction of a substantially saturated hydrocarbon-substituted or halohydrocarbon-substituted succinic acid or anhydride with at least one alcohol; the amount of said dispersant being sufficient to produce a stable solution or dispersion of the resulting polymer in said diluent.

2. A concentrate according to claim 1 wherein said monomer A is at least one vinyl aromatic compound, vinyl-substituted heterocyclic compound containing a nitrogen atom as part of the heterocyclic ring, vinyl ester of a carboxylic acid, or ester, mide or nitrile of acrylic or methacrylic acid.

3. A concentrate according to claim 2 wherein the substituent on the succinic acid or anhydride contains at least about 50 carbon atoms.

4. A concentrate according to claim 3 wherein said monomer A is at least one of styrene, acrylonitrile and diacetone acrylamide.

5. a lubricating composition comprising a major amount of a lubricating oil and a minor amount, sufficient to improve dispersancy, extreme pressure properties or viscosity, of a composition prepared by polymerizing, under free radical polymerization conditions and at a temperature of about 30°–90° C.; (A) at least one ethylenically unsaturated monomer having from 3 to about 10 carbon atoms and a terminal olefinic bond and selected from the group consisting of unsaturated monohydric and polyhydric alcohols and carboxylic acid esters thereof, esters of unsaturated carboxylic acids and saturated alcohols, vinyl cyclic compounds, unsaturated ethers, unsaturated ketones, amides of unsaturated carboxylic acids, unsaturated aliphatic hydrocarbons, alkenyl halides and unsaturated nitriles; in the presence of (B) at least one oil-soluble dispersant incapable of addition polymerization, said dispersant being prepared by the reaction of a substantially saturated hydrocarbon-substituted or halohydrocarbon-substituted succinic acid or anhydride with at least one alcohol; the amount of said dispersant being sufficient to produce a stable solution or dispersion of the resulting polymer in an inert diluent at a total concentration of said composition of about 20–90% by weight.

6. A lubricating composition according to claim 5 wherein said monomer A is at least one vinyl aromatic compound, vinyl-substituted heterocyclic compound containing a nitrogen atom as part of the heterocyclic ring, vinyl ester of a carboxylic acid, or ester, amide or nitrile of acrylic or methacrylic acid.

7. A lubricating composition according to claim 6 wherein the substituent on the succinic acid or anhydride contains at least about 50 carbon atoms.

8. A lubricating composition according to claim 7 wherein said monomer A is at least one of styrene, acrylonitrile and diacetone acrylamide.

* * * * *